US012612557B2

(12) United States Patent
Patel et al.

(10) Patent No.: US 12,612,557 B2
(45) Date of Patent: Apr. 28, 2026

(54) PLASTIC WASTE PYROLYSIS WITH LIQUID RECYCLE

(71) Applicant: ExxonMobil Chemical Patents Inc., Baytown, TX (US)

(72) Inventors: Bryan A. Patel, Jersey City, NJ (US); Randolph J. Smiley, Hellertown, PA (US); Saurabh S. Maduskar, Houston, TX (US); Sundararajan Uppili, Jersey Village, TX (US); Michael W. Weber, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 215 days.

(21) Appl. No.: 18/007,446

(22) PCT Filed: Jul. 14, 2021

(86) PCT No.: PCT/US2021/041575
§ 371 (c)(1),
(2) Date: Jan. 30, 2023

(87) PCT Pub. No.: WO2022/020151
PCT Pub. Date: Jan. 27, 2022

(65) Prior Publication Data
US 2023/0287276 A1      Sep. 14, 2023

Related U.S. Application Data

(60) Provisional application No. 63/111,998, filed on Nov. 10, 2020, provisional application No. 63/055,374, filed on Jul. 23, 2020.

(51) Int. Cl.
*C10G 1/10*        (2006.01)
*B09B 3/40*        (2022.01)
(Continued)

(52) U.S. Cl.
CPC .................. *C10G 1/10* (2013.01); *B09B 3/40* (2022.01); *C10B 49/22* (2013.01); *C10B 53/07* (2013.01);
(Continued)

(58) Field of Classification Search
None
See application file for complete search history.

(56) References Cited

U.S. PATENT DOCUMENTS 4,108,730 A  *  8/1978  Chen ........................ C10G 1/10
                                                          201/23
4,118,281 A    10/1978  Yan ................................. 201/2.5
(Continued)

FOREIGN PATENT DOCUMENTS

CN        101230284        1/2007    .............. C08J 11/10
JP        H06-80970        3/1994    .............. C10B 53/00
(Continued)

OTHER PUBLICATIONS

Lopez, G. et al. (2017) "Thermochemical Routes for the Valorization of Waste Polyolefinic Plastics to Produce Fuels and Chemicals. A Review," *Renewable and Sustainable Energy Reviews*, v.73(C), pp. 346-368.

*Primary Examiner* — Youngsul Jeong
*Assistant Examiner* — Alyssa L Cepluch
(74) *Attorney, Agent, or Firm* — C. Tumey Law Group PLLC

(57)            ABSTRACT
Systems and methods are provided for conversion of polymers (such as plastic waste) to olefins. The systems and methods can include a recycle loop so that a portion of the pyrolysis effluent can be combined with solid plastic feedstock. The input flow to the pyrolysis reactor can correspond to a slurry of plastic particles in recycled effluent or a solution of plastic in recycled effluent.

17 Claims, 3 Drawing Sheets

(51) Int. Cl.
| | |
|---|---|
| *C10B 49/22* | (2006.01) |
| *C10B 53/07* | (2006.01) |
| *C10B 55/10* | (2006.01) |
| *C10B 57/04* | (2006.01) |
| *C10G 9/32* | (2006.01) |
| *B09B 101/75* | (2022.01) |

(52) U.S. Cl.
CPC ............ *C10B 55/10* (2013.01); *C10B 57/045* (2013.01); *C10G 9/32* (2013.01); *B09B 2101/75* (2022.01); *C10G 2300/1003* (2013.01); *C10G 2300/301* (2013.01); *C10G 2300/4006* (2013.01)

(56)        References Cited

U.S. PATENT DOCUMENTS

| | | | | |
|---|---|---|---|---|
| 5,326,919 | A | 7/1994 | Paisley et al. ................. | 585/241 |
| 5,340,464 | A | 8/1994 | Mickas .......................... | 208/131 |
| 5,481,052 | A | 1/1996 | Hardman et al. ............. | 585/241 |
| 5,821,395 | A * | 10/1998 | Price ........................ | C10G 1/10 |
| | | | | 423/241 |
| 5,846,385 | A * | 12/1998 | Chien ........................ | F23G 5/16 |
| | | | | 201/3 |
| 6,861,568 | B1 | 3/2005 | Guffey et al. ................ | 585/241 |
| 9,212,318 | B2 | 12/2015 | Narayanaswamy et al. ................ | |
| | | | | C10G 1/10 |
| 9,920,255 | B2 | 3/2018 | Hofer ........................ | C10G 1/10 |
| 11,225,609 | B2 * | 1/2022 | Sundaram ............... | C10B 53/02 |
| 2018/0371325 | A1 * | 12/2018 | Streiff .................. | C10G 11/187 |
| 2019/0002664 | A1 * | 1/2019 | Streiff .................... | C10G 55/06 |
| 2021/0189248 | A1 * | 6/2021 | Timken .................. | C10G 1/002 |
| 2022/0402006 | A1 * | 12/2022 | Wu .......................... | C10B 49/22 |

FOREIGN PATENT DOCUMENTS

| | | | | |
|---|---|---|---|---|
| WO | WO1995/014069 | 11/1994 | ............... | C10G 9/14 |
| WO | WO2022/020152 | 1/2022 | ............... | C10G 1/10 |

* cited by examiner

PLASTIC WASTE PYROLYSIS WITH LIQUID RECYCLE

CROSS-REFERENCE TO RELATED APPLICATIONS

This application claims the priority benefit of U.S. Ser. No. 63/055,374, filed Jul. 23, 2020, and U.S. Ser. No. 63/111,998, filed Nov. 10, 2020, the disclosures of which are incorporated herein by reference.

FIELD

Systems and methods are provided for pyrolysis of plastic waste by using a liquid recycle as a transport medium for the plastic waste.

BACKGROUND

Recycling of plastic waste is a subject of increasing importance. Conventionally, polyolefins in plastic waste are converted by various methods, such as pyrolysis or gasification, to produce energy. While this provides a pathway for using waste plastic a second time, ultimately methods for generation of energy from plastic waste also result in conversion of the plastic waste into $CO_2$. To make the process fully circular, so that the polymers can be recycled for return to the same usage, these pyrolysis and gasification products need to go through further pyrolysis or conversion processes to return them back to the light olefin monomer. The olefin monomers can then be repolymerized back to the polyolefin for use in the same service. Unfortunately, this process to make light olefins is high in energy usage, capital required, and produces relatively low yields of the light olefin monomers. It would be desirable to develop systems and methods that can allow for a circular recycle path for polyolefins with improved olefins yields.

U.S. Pat. No. 5,326,919 describes methods for monomer recovery from polymeric materials. The polymer is pyrolyzed by heating the polymer at a rate of 500° C./second in a flow-through reactor in the presence of a heat transfer material, such as sand. Cyclone separators are used for separation of fluid products from solids generated during the pyrolysis. However, the resulting vapor phase monomer product corresponds to a mixture of olefins, and therefore is not suitable for synthesis of new polymers.

U.S. Pat. No. 9,212,318 describes a catalyst system for pyrolysis of plastics to form olefins and aromatics. The catalyst system includes a combination of an FCC catalyst and a ZSM-5 catalyst.

U.S. Pat. No. 5,481,052 describes an example of using a screw feeder to introduce plastic pellets into a fluidized bed pyrolysis reactor.

U.S. Pat. No. 6,861,568 describes a method for performing radical-initiated pyrolysis on plastic waste dissolved in an oil medium. Although recycle was generally described, the examples in the description all involved mixing fresh plastic waste with another type of petroleum oil that was different from the liquids formed by decomposition of plastics.

Chinese Patent CN101230284 describes methods for coking of plastic waste. The plastic waste is pulverized to form small particles. The resulting particles are fluidized using a screw extrusion conveyor, followed by heating and extrusion to convert the plastic waste into a semi-fluid state. The heated and extruded plastic waste is then stored at a temperature of 290° C. to 320° C. to maintain the plastic in a liquid state. The liquid plastic waste is then pumped into the coker furnace.

U.S. Pat. No. 9,920,255 describes methods for depolymerization of plastic material. The methods include melting and degassing a plastic feed to form molten plastic. A liquid crude fraction is then added to the molten plastic to reduce the viscosity prior to introducing the mixture of molten plastic and liquid crude into the pyrolysis reactor.

SUMMARY

In various aspects, a method for performing pyrolysis on a plastic feedstock is provided. The method includes mixing a feedstock comprising plastic particles having an average diameter of 3.0 cm or less with a recycled effluent fraction to form a slurry of plastic particles in recycled effluent. A weight ratio of the recycled effluent fraction to the plastic particles can be 1.0 or more. The mixing can be performed at a temperature of 150° C. or less. The method can further include introducing the slurry of plastic particles in recycled effluent into a fluidized bed pyrolysis reactor. The slurry of plastic particles in recycled effluent can be exposed to a temperature of 300° C. or more for a thermal residence time of 30 seconds or less prior to the introduction into the fluidized bed pyrolysis reactor. The method can further include pyrolyzing the slurry of plastic particles in recycled effluent in the fluidized bed pyrolysis reactor at a temperature of 500° C. to 900° C. to form a pyrolysis effluent. A fluidized bed in the fluidized bed pyrolysis reactor can include heat transfer particles. The pyrolysis conditions can include a single pass conversion of 15 wt % to 50 wt % relative to a conversion temperature of 370° C. or less. The method can further include separating at least a portion of the heat transfer particles from the pyrolysis effluent. Additionally, the method can include separating the pyrolysis effluent to form a bottoms fraction including the recycled effluent fraction and at least one additional fraction, the bottoms fraction having a T10 distillation point of the conversion temperature or less. Optionally, the weight ratio of the recycled effluent fraction to the plastic particles can be 1.0 to 5.0.

In various additional aspects, a method for performing pyrolysis on a plastic feedstock is provided. The method includes mixing a feedstock containing plastic particles having an average diameter of 3.0 cm or less with a recycled effluent fraction to form a solution of plastic in recycled effluent, a weight ratio of the recycled effluent fraction to the plastic being 0.2 or more. The method further includes pyrolyzing the solution in a pyrolysis reactor under pyrolysis conditions (including a temperature of 500° C. to 900° C.) to form a pyrolysis effluent. The pyrolysis conditions can include a single pass conversion of 40 wt % or less relative to a conversion temperature of 370° C. or less. Additionally, the method can include separating the pyrolysis effluent to form a bottoms fraction including the recycled effluent fraction and at least one additional fraction, the bottoms fraction having a T10 distillation point of the conversion temperature or less. Optionally, the mixing can include mixing the feedstock containing plastic particles and the recycled effluent at a temperature of 120° C. or more for a mixing residence time of 1.0 seconds to 600 seconds. Optionally, the mixing can include forming a mixture at a temperature of 150° C. or less, and heating the mixture to a temperature of 120° C. or more for a mixing residence time of 1.0 seconds to 600 seconds.

DETAILED DESCRIPTION

Figure 1:
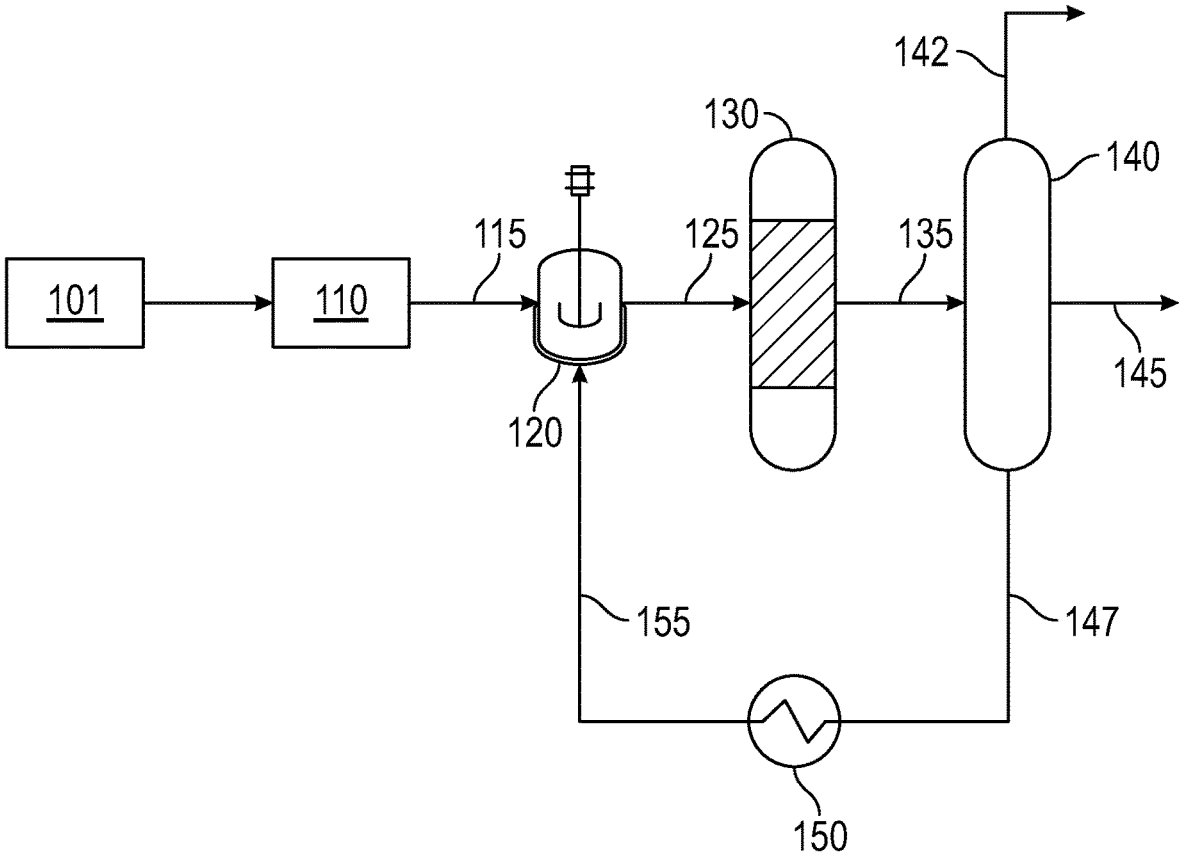
FIG. 1 shows an example of a process configuration for pyrolysis of solid plastic feedstock with substantial effluent recycle.

All numerical values within the detailed description and the claims herein are modified by "about" or "approximately" the indicated value, and take into account experimental error and variations that would be expected by a person having ordinary skill in the art.

In various aspects, systems and methods are provided for conversion of polymers (such as plastic waste) to olefins. The systems and methods can include a recycle loop so that a portion of the pyrolysis effluent can be combined with solid plastic feedstock. In some aspects, a slurry of plastic feedstock particles in the recycle liquid can be used as the input flow to the pyrolysis reactor. A slurry can be formed by combining a liquid recycle stream and plastic particles at a temperature below the melting temperature of the plastic particles and in a weight ratio of recycle liquid to plastic particles between roughly 1.0 to 5.0 (i.e., between 1:1 and 5.0:1). Having a weight ratio of recycle liquid to plastic particles of 1.0 or more can provide sufficient fluid in the slurry so that the slurry has a suitable kinematic viscosity for transport (i.e., suitable for pumping and/or flowing) within a reaction system. At weight ratios of recycle liquid to plastic of greater than 5.0, the plastic particles will have an increased tendency to form a solution rather than a slurry as the mixture of recycle fluid and plastic particles is heated on the way to the pyrolysis reactor.

In other aspects, recycle liquid can be mixed with the solid plastic feedstock particles at a sufficiently high temperature and/or in a sufficiently high ratio of recycle liquid to plastic to result in formation of a solution. It is noted that a solution can potentially be formed by any weight ratio of recycle liquid to plastic if the mixing is performed at a temperature above the melting temperature of the plastic particles. However, as a practical matter, solutions with a manageable viscosity for transport within a reaction system can be desirable. In some aspects, a solution with a manageable kinematic viscosity for transport within the reaction system can correspond to a solution with a weight ratio of recycle liquid to plastic particles of 0.2 or more, or 1.0 or more, or 2.0 or more, or 4.0 or more, or 5.0 or more, such as up to 15 or possibly still higher. At higher recycle ratios, such as a weight ratio of recycle liquid to plastic particles of 4.0 or more (or 5.0 or more), it may be possible to form a solution at temperatures below the melting temperature of the plastic particles. Additionally or alternately, a solution with a manageable kinematic viscosity for transport can have a kinematic viscosity at 100° C. of 1000 cSt or less, or 100 cSt or less, such as down to 0.1 cSt or possibly still lower. Optionally, the recycled effluent can correspond to heavier fraction or bottoms fraction of the pyrolysis effluent.

One of the difficulties with processing a polymer-based feedstock by pyrolysis, such as a plastic waste feedstock, is managing the input flow of the feedstock into the pyrolysis reactor. Various types of plastics, such as polyolefins, have melting points that are well below typical pyrolysis temperatures. As a result, when using conventional methods for introducing plastic into a pyrolysis reactor, the plastic feedstock can end up in a mixed state corresponding to some solid phase plastic and some (melted) liquid phase plastic. Having a mixed phase feed can present difficulties, as a feeding mechanism that is suitable for moving solid phase particles can often have limited effectiveness for moving liquid phase materials. Similarly, a feeding mechanism that is suitable for moving liquid phase material can often have difficulty with transport of solid particles.

In addition to difficulties with moving liquid phase and/or solid phase material, the use of solid phase or liquid phase (molten) plastic as a feedstock can pose challenges within a reaction environment. For example, although molten plastic is technically a liquid, the viscosity of molten plastic can be relatively high. Additionally, molten plastic can exhibit non-Newtonian flow properties. These less desirable flow characteristics can make it difficult to move and distribute molten plastic within a reactor that is designed to handle liquid feeds. With regard to movement, solid plastic particles tend to behave similarly to other types of particles. Unfortunately, this means that solid plastic particles have similar limitations to other types of particles. For example, use of solid plastic particles as a feed can limit the types of reactors that can handle the plastic feed.

Conventionally, operating a pyrolysis reactor with a substantial product recycle rate is not a preferred option. A substantial product recycle can correspond to operating a reactor with a recycle ratio of 1.0 or more, where the recycle ratio is defined as the wt % of recycled effluent relative to the wt % of fresh input feed. Operating a reactor while using a recycle to fresh feed weight ratio (i.e., a recycle ratio) of 1.0 or more (or 2.0 or more, or 4.0 or more, or 5.0 or more) means that the amount of feed that can be processed within a given reactor footprint is substantially reduced. This results in corresponding increases in both equipment costs and operating costs for processing a given volume of feed. It has been discovered, however, that performing plastic waste pyrolysis with substantial recycle can provide processing advantages that overcome the conventional increases in equipment and processing costs.

Some advantages can be related to the ability to reduce the severity of the pyrolysis process. For example, naphtha boiling range and/or distillate boiling range portions of the pyrolysis effluent can be separated out as a product stream, while any heavier portions of the effluent can be used as a recycle stream. In such aspects, the recycling of the pyrolysis effluent can allow heavier portions of the input flow to pyrolysis to be selectively exposed to the pyrolysis conditions multiple times while allowing portions of the effluent in a desired boiling range to be removed from the system. Because the heavier portions of the effluent are recycled, a desired amount of net conversion of the fresh plastic feed can be achieved even though the single pass conversion within the reactor is relatively low. The resulting product stream can either be used directly as a product, or the product stream can be used as a feed for subsequent processing, such as a feed for a steam cracking process.

Other advantages can be related to the type of pyrolysis that can be performed. In some aspects, plastic particles can be dissolved in a recycled effluent portion. Such a solution of plastic in recycled effluent can be formed by exposing a mixture of recycled effluent and plastic particles to a sufficient temperature for a sufficient amount of time. Generally, forming a solution can involve heating a mixture of recycled effluent and plastic to a temperature that is roughly equal to or greater than the melting point for the plastic particles. For high weight ratios of recycled effluent to plastic, such as a recycled effluent to plastic weight ratio of 4.0 or more (or 5.0 or more), the time for forming a solution can be relatively short, such as 10 seconds or less in a well-mixed environment. As a result, for high weight ratios of recycled effluent to plastic, heating the mixture to a temperature of 120° C. or more (or 150° C. or more) prior to entering the pyrolysis reactor can generally be sufficient to form a solution. At lower weight ratios of recycled effluent to plastic, such as a weight ratio of 2.0 to 4.0 (or 2.0 to 5.0), additional time may be needed to form a solution. In aspects where a solution is formed, the advantages of using a liquid feed in a reaction system can be achieved while avoiding the difficulties of high viscosity and/or non-Newtonian fluid behavior associated with molten plastic. In such aspects, using a sufficient amount of pyrolysis effluent as a recycle stream can allow plastic to be pyrolyzed in any convenient type of reactor that can perform pyrolysis on a liquid hydrocarbon feed. Additionally, conventional methods for transport and distribution of liquid hydrocarbon feeds can be used to deliver the feed to the reactor and/or distribute the feed within the reactor.

In aspects where a slurry of plastic particles is formed in recycled effluent by using a recycle ratio of 1.0 to 5.0, the type of pyrolysis reactor can be somewhat constrained due to the presence of the plastic particles in the slurry. Additionally, in order to avoid melting of the plastic and/or forming a solution, it can be desirable to reduce or minimize the amount of time the slurry is at a temperature of 120° C. or more, or 150° C. or more, prior to entering the pyrolysis reactor. However, concerns about transfer of heat into the plastic particles can be reduced or minimized. In aspects where the plastic is physically processed prior to introduction into the slurry, so that the particles have a sufficiently small particle size, the heat transfer properties of the slurry can be similar to the heat transfer properties of the liquid recycled effluent used to form the slurry. Additionally, the slurry can be transported and/or distributed within a reaction system using conventional methods for handling slurry flows.

Still another advantage of using the pyrolysis effluent as a recycle stream is that compatibility issues between the fresh plastic feed and the recycled solvent or slurry fluid can be reduced or minimized. For example, if the fresh plastic feed corresponds to primarily paraffinic polymers, the resulting pyrolysis effluent can also be primarily composed of paraffinic species. If the fresh plastic feed includes a substantial portion of polystyrene or other aromatics, the resulting pyrolysis effluent can tend to include at least a portion of such aromatics.

In addition to reducing or minimizing compatibility issues, it has been discovered that using a recycle fraction as the solvent or carrier fluid for a slurry can impact the desired conditions for the pyrolysis reaction. In particular, the conversion of both the fresh plastic waste and the recycled liquid products is relevant for determining how to achieve a desired level of total conversion for a plastic waste feedstock.

In this discussion, a reference to a "$C_x$" fraction, stream, portion, feed, or other quantity is defined as a fraction (or other quantity) where 50 wt % or more of the fraction corresponds to hydrocarbons having "x" number of carbons. When a range is specified, such as "$C_x$-$C_y$", 50 wt % or more of the fraction corresponds to hydrocarbons having a number of carbons between "x" and "y". A specification of "$C_{x+}$" (or "$C_{x-}$") corresponds to a fraction where 50 wt % or more of the fraction corresponds to hydrocarbons having the specified number of carbons or more (or the specified number of carbons or less).

In this discussion, the naphtha boiling range is defined as 30° C. (roughly the boiling point of $C_5$ alkanes) to 177° C. The distillate boiling range is defined as 177° C. to 350° C. The vacuum gas oil boiling range is defined as 350° C. to 565° C. The resid boiling range is defined as 565° C.+. A fraction that is referred to as corresponding to a boiling range is defined herein as a fraction where 80 wt % or more (or 90 wt % or more, such as up to 100 wt %) of the fraction boils within the specified boiling range. Thus, a naphtha boiling range fraction is a fraction where 80 wt % or more (or 90 wt % or more) of the fraction boils within the naphtha boiling range. A fraction corresponding to a naphtha plus distillate fraction can have 80 wt % or more (or 90 wt % or more) of compounds that boil between 30° C. and 350° C. A fraction corresponding to vacuum gas oil plus resid can include 80 wt % or more (or 90 wt % or more) of compounds with a boiling point of 350° C. or more.

Plastic Feedstock

In various aspects, a plastic feedstock for pyrolysis can include or consist essentially of one or more types of polymers, such as polymers corresponding to plastic waste. The systems and methods described herein can be suitable for processing plastic waste corresponding to a single type of olefinic polymer and/or plastic waste corresponding to a plurality of olefinic polymers. In aspects where the feedstock consists essentially of polymers, the feedstock can include one or more types of polymers as well as any additives, modifiers, packaging dyes, and/or other components typically added to a polymer during and/or after formulation. The feedstock can further include any components typically found in polymer waste.

In some aspects, the polymer feedstock can include at least one of polyethylene and polypropylene. The polyethylene can correspond to any convenient type of polyethylene, such as high density or low density versions of polyethylene. Similarly, any convenient type of polypropylene can be used. In addition to polyethylene and/or polypropylene, the plastic feedstock can optionally include one or more of polystyrene, polyvinylchloride, polyamide (e.g., nylon), polyethylene terephthalate, and ethylene vinyl acetate. Still other polyolefins can correspond to polymers (including co-polymers) of butadiene, isoprene, and isobutylene. In some aspects, the polyethylene and polypropylene can be present in the mixture as a co-polymer of ethylene and propylene. More generally, the polyolefins can include co-polymers of various olefins, such as ethylene, propylene, butenes, hexenes, and/or any other olefins suitable for polymerization.

In this discussion, unless otherwise specified, weights of polymers in a feedstock correspond to weights relative to the total polymer content in the feedstock. Any additives and/or modifiers and/or other components included in a formulated polymer are included in this weight. However, the weight percentages described herein exclude any solvents or carriers that might optionally be used to facilitate transport of the polymer into the initial pyrolysis stage.

In aspects where the plastic feedstock includes less than 100 wt % of polyethylene and/or polypropylene, the plastic feedstock can optionally include 0.01 wt % or more of other polymers, or 0.1 wt % or more of other polymers. For example, in some aspects the plastic feedstock can include 0.01 wt % to 35 wt % of polystyrene, or 0.1 wt % to 35 wt %, or 1.0 wt % to 35 wt %, or 0.01 wt % to 20 wt %, or 0.1 wt % to 20 wt %, or 1.0 wt % to 20 wt %, or 10 wt % to 35 wt %, or 5 wt % to 20 wt %.

In some aspects, the plastic feedstock can optionally include 0.01 wt % to 10 wt %, or 0.1 wt % to 10 wt %, or 0.01 wt % to 2.0 wt %, or 0.01 wt % to 1.0 wt % of polyvinyl chloride, polyvinylidene chloride, or a combination thereof, and/or 0.1 wt % to 1.0 wt % polyamide. Polyvinyl chloride is roughly 65% chlorine by weight. As a result, pyrolysis of polyvinyl chloride (and/or polyvinylidene chloride) can result in formation of substantial amounts of hydrochloric acid relative to the initial weight of the polyvinyl chloride. In limited amounts, the hydrochloric acid that results from pyrolysis of polyvinyl chloride and/or polyvinylidene chloride can be removed using guard beds prior the secondary cracking stage. Additionally or alternately, calcium oxide particles can be added to the heat transfer particles in the pyrolysis reactor. With regard to polyamide, pyrolysis results in formation of $NO_x$. Limiting the amount of $NO_x$ can simplify any downstream handling of the contaminants removed from the pyrolysis effluent.

In various aspects, the plastic waste can be prepared for introduction as a plastic feedstock for mixing with recycled effluent to form a slurry or solution. Depending on the nature of the plastic feedstock, this can include using one or more physical processes to convert the plastic feedstock into particles and/or to reduce the particle size of the plastic particles.

For plastic waste feedstock that is not initially in the form of particles, a first processing step can be a step to convert the plastic feedstock into particles and/or to reduce the particle size. This can be accomplished using any convenient type of physical processing, such as chopping, crushing, grinding, shredding or another type of physical conversion of plastic solids into particles. It is noted that it may be desirable to convert plastic into particles of a first average and/or median size, followed by additional physical processing to reduce the size of the particles.

Having a small particle size can facilitate solvation of the plastic particles and/or distribution of plastic particles within a slurry in a desirable time frame. Thus, physical processing can optionally be performed to reduce the median particle size of the plastic particles to 3.0 cm or less, or 2.5 cm or less, or 2.0 cm or less, or 1.0 cm or less, such as down to 0.01 cm or possibly still smaller. For determining a median particle size, the particle size is defined as the diameter of the smallest bounding sphere that contains the particle.

Formation of Slurry or Solution of Plastic Particles in Recycled Effluent

The plastic particles can then be mixed with recycled effluent. In some aspects, the recycled effluent can be mixed with plastic particles to form a slurry. A slurry can be formed, for example, for mixtures with a weight ratio of recycled effluent to plastic particles of 1.0 to 5.0, or 1.0 to 4.0. In aspects where a slurry is formed, the recycled effluent can be at a temperature between 20° C. and 150° C. during the mixing, or between 50° C. and 150° C., or between 20° C. and 120° C., or between 50° C. and 120° C., or between 20° C. and 100° C., or between 50° C. and 100° C. This can allow the recycled effluent to mix with the particles without causing substantial melting of the particles.

In aspects where a slurry is formed the mixture of recycled effluent and solvent can be allowed to mix prior to further heating for a sufficient period of time to produce a well-mixed slurry. In some aspects, this can correspond to no additional mixing beyond the mixing time required to travel in conduits from the mixing vessel to the pyrolysis reactor. In other aspects, the mixing time can correspond to 1.0 seconds to 120 seconds. After this mixing, the slurry of plastic particles in recycled effluent can be heated to a desired temperature prior to entering the pyrolysis reactor. It is noted that heating the slurry can potentially result in melting of the plastic particles. However, after formation of the slurry, the high viscosity of the melted plastic can tend to reduce or minimize spread of the melted plastic within the slurry. So long as the slurry spends less than a thermal residence time at temperatures above the melting point of the plastic particles, the amount of melting can be reduced or minimized so that the mixture behaves substantially like a slurry. In some aspects, the slurry can be heated prior to entering the pyrolysis reactor to a pre-heating temperature of 200° C. or more, or 250° C. or more, or 300° C. or more, such as up to 500° C. or possibly still higher. In some aspects, the thermal residence time for the slurry at or above the pre-heating temperature of 200° C. or more, or 250° C. or more, or 300° C. or more, can be limited to reduce or minimize the impact of melted plastic particles. In such aspects, the thermal residence time for the slurry at or above the pre-heating temperature can be 30 seconds or less, or 20 seconds or less, or 10 seconds or less, such as down to 0.1 seconds or possibly having no pre-heating to a temperature of 200° C. or more.

One indicator that a slurry has been formed can be the kinematic viscosity of the resulting mixture. The kinematic viscosity of a slurry is not dependent on the viscous properties of the plastic particles. Instead, the kinematic viscosity of a slurry is based on the viscosity of the recycled effluent and the volume fraction of the plastic particles in the slurry. Equation 1 shows the general formula for how the kinematic viscosity of a slurry at a given temperature varies with the concentration of particles in the slurry.

$$\frac{\mu_{Slurry}}{\mu_S} = \left(1 - \frac{\varphi}{\varphi_M}\right)^{-a\varphi_M} \tag{1}$$

In Equation 1, $\mu_{Slurry}$ is the viscosity of the slurry. $\mu_S$ is the kinematic viscosity of the solvent/fluid corresponding to the liquid phase of the slurry in the absence of slurry particles (in this case, the kinematic viscosity of the recycled effluent). $\varphi$ is the volume fraction of particles in the slurry. "$\varphi_M$" is an empirical constant corresponding to a "maximum" volume fraction of particles in the slurry. "a" is another empirical constant corresponding to an intrinsic viscosity constant. As shown in Equation 1, the viscosity of a slurry increases exponentially as the volume fraction of particles in the slurry is increased.

For a solution of plastic in recycled effluent, a different type of behavior is observed as the concentration of plastic is varied. Equation 2 shows the variation of kinematic viscosity with plastic concentration for a solution of plastic in recycled effluent. (2) $\ln(\mu_{solution}) = x \ln(\mu_p) + (1-x)\ln(\mu_s) + k (1-x)x(\ln(\mu_p) - \ln(\mu_s))/2$ In Equation 2, $\mu_{Solution}$ is the viscosity of the solution. $\mu_S$ is the kinematic viscosity of the recycled effluent. "$\mu_p$" is the kinematic viscosity of the plastic. "x" is the weight fraction of plastic in the solution. "k" is an empirical constant corresponding to an interaction parameter. As shown in Equation 2, at low concentrations of plastic, the kinematic viscosity of the solution is similar to the kinematic viscosity of the recycled effluent. As the amount of plastic increases, the kinematic viscosity varies as a weighted average of the natural logs of the kinematic viscosities for the recycled effluent and plastic, with an interaction term that is a maximum for a solution containing 50 wt % plastic.

In other aspects, the recycled effluent and plastic particles can be mixed to form a solution. To form a solution, the recycled effluent and plastic can be mixed and/or maintained as a mixture for a sufficient period of time, referred to as a mixing residence time, to allow the plastic particles to dissolve in the recycled effluent. This additional mixing and/or maintaining during the mixing residence time can occur at any convenient location prior to entering the pyrolysis reactor. For example, in some aspects, at least part of the mixing residence time can correspond to time that the mixture is flowing in a conduit from the initial mixing vessel to the pyrolysis reactor. In other aspects, all of the mixing residence time can be spent in a mixing vessel prior to transporting the solution to the pyrolysis reactor. Preferably, during the mixing residence time, the mixture of recycled effluent and plastic can be at a temperature above the melting point of the plastic particles to facilitate forming the solution. For example, during the mixing residence time to form the solution, the mixture of recycled effluent and plastic can be at a temperature of 120° C. or more, or 150° C. or more, such as up to 500° C. or possibly still higher. Optionally, the solution can be formed by initially mixing the recycled effluent and plastic particles at a temperature of 20° C. to 150° C., or 20° C. to 120° C., followed by heating the solution and maintaining the solution for the mixing residence time at a temperature of 120° C. or more, or 150° C. or more. Depending on the aspect, the mixing residence time can be 1.0 seconds to 600 seconds, or 1.0 seconds to 120 seconds, or 1.0 second to 10 seconds, or 10 seconds to 600 seconds, or 10 seconds to 120 seconds. After this mixing, the solution of plastic in recycled effluent can optionally be further heated to a desired temperature prior to entering the pyrolysis reactor. In some aspects, the solution can be heated prior to entering the pyrolysis reactor to a temperature of 200° C. or more, or 250° C. or more, or 300° C. or more, such as up to 500° C. or possibly still higher.

Processing Conditions—Initial Pyrolysis Stage

In various aspects, the slurry of plastic particles or the solution of plastic in recycled effluent can be fed into one or more pyrolysis reactors. After forming the slurry or solution, the feedstock is heated to a temperature between 400° C.-900° C., or 500° C.-900° C., or 400° C.-700° C., or 550° C. to 700° C., or 400° C.-500° C., for a reaction time to perform pyrolysis. The temperature can depend in part on the desired products. In aspects where a portion of the pyrolysis effluent will be exposed to a second thermal cracking stage, lower temperatures can be used in order to increase the yield of liquid phase products. Additionally, the amount of recycle that is desired can influence the temperature and/or the residence time, as lower single pass conversion rates can be used with recycle to achieve higher total conversion values. In some aspects, the reaction time where the feedstock is maintained at or above 500° C. can be limited in order to reduce or minimize formation of coke. In some aspects, the reaction time can correspond to 0.1 seconds to 6.0 seconds, or 0.1 seconds to 5.0 seconds, or 0.1 seconds to 1.0 seconds, or 1.0 seconds to 6.0 seconds, or 1.0 seconds to 5.0 seconds. The pyrolyzed feedstock is cooled to below 500° C. at the end of the reaction time.

In some aspects, diluent steam can also be fed into the pyrolysis reactor. The steam also serves as a fluidizing gas.

In aspects where additional diluent steam is added, the weight ratio of steam to plastic feedstock can be between 0.3:1 to 10:1.

In some aspects, the temperature and reaction time can be selected to provide a desired rate of single pass conversion. The amount of single pass conversion can be defined relative to a convenient conversion temperature. As an illustrative example, if the conversion temperature is 370° C., specifying an amount of single pass conversion of 40 wt % or more would correspond to converting 40 wt % of the 370° C. products in the input flow to pyrolysis into 370° C.- products in the pyrolysis effluent. In other words, of the material in the input flow (recycled effluent plus fresh feed) that has a boiling point of 370° C. or more, 40 wt % of this material is converted to 370° C.- products. This can be referred to as an amount of single pass conversion relative to 370° C.

In some aspects, if the goal is to convert the plastic waste sufficiently to form a feed with a specified T95 distillation point or a specified final boiling point, it can be convenient to select the pyrolysis conditions based on a conversion temperature that roughly corresponds to the desired T95 distillation point or desired final boiling point. For example, if it is desired to use pyrolysis to form a net product stream with a T95 distillation point (or final boiling point) of 370° C. or less, then it may be convenient to specify the pyrolysis conditions relative to a conversion temperature of 370° C. Depending on the aspect, the conversion temperature used for defining single pass conversion can be 370° C. (or less), or 300° C. (or less), or 250° C. (or less), or 200° C. (or less), such as down to 150° C. or possibly still lower. In some aspects, the conversion temperature can also roughly be used to define the recycled portion of the effluent. In such aspects, if conversion is measured relative to 370° C., then the 370° C.+ portion of the effluent from pyrolysis can be recycled. As another example, in such aspects, if the conversion is measured relative to 300° C., then the 300° C.+ portion of the effluent can be recycled. It is noted that such a selection is for convenience, as selecting a conversion temperature for characterizing the reaction that is related to the cut point for forming the recycle fraction can simplify the relationship between conversion in the reactor and the recycle rate.

In various aspects, the single pass conversion relative to a conversion temperature can be selected to provide single pass conversion relative to the conversion temperature of 50 vol % and/or 50 wt % or less. It is noted that plastic waste feeds can tend to have boiling points well above 400° C. Thus, for a conversion temperature of 370° C. or less, substantially the entire amount of the fresh feed will have a boiling point greater than the conversion temperature. In this type of situation, if the single pass conversion rate within a reactor is 50 wt % or vol %, and if the unconverted material is recycled, by definition the amount of recycled material will equal the amount of fresh feed. Thus, by having single pass conversion of 50 vol % or less (or 50 wt % or less), the ratio of recycled material to fresh feed can be 1.0 or more.

Depending on the aspect, the amount of conversion relative to the conversion temperature can be 50 wt % or less. More generally, the single pass conversion relative to the conversion temperature can be 10 wt % to 50 wt %, or 15 wt % to 50 wt %, or 20 wt % to 50 wt %, or 10 wt % to 40 wt %, or 15 wt % to 40 wt %, or 20 wt % to 40 wt %, or 10 wt % to 35 wt %, or 15 wt % to 35 wt %, or 15 wt % to 25 wt %, or 10 wt % to 25 wt %. In such aspects, the conversion temperature can be 370° C. or less, or 300° C. or less, or 250° C. or less, or 200° C. or less, such as down to 150° C. or possibly still lower.

In addition to single pass conversion, the net conversion of fresh feed can be specified. The net conversion of fresh feed corresponds to the amount of fresh feed that boils above the conversion temperature that is eventually converted to compounds that boil below the conversion temperature, regardless of how many passes a particular compound makes through the reactor. In various aspects, the net conversion of fresh feed can be 90 wt % or more, or 95 wt % or more, such as up to substantially complete net conversion (relative to the conversion temperature) of fresh feed that is exposed to the pyrolysis conditions.

For a solution of plastic in recycled effluent, any convenient type of pyrolysis reactor can be used. Examples of suitable reactor types include fluidized bed reactors, with sand or another heat transfer particle acting as the fluidized bed; moving bed reactors; stirred tank reactors, including stirred tank reactors that are externally- and/or internally-heated; and furnace tubes, visbreaker reactors, coker reactors, and/or other thermal cracking reactors. For a slurry of plastic particles in recycled effluent, the reactor can correspond to a reactor that can accommodate the presence of plastic particles and/or droplets of molten plastic in the feed. A fluidized bed reactor is an example of a suitable type of reactor for processing of a slurry feed.

A fluidized bed reactor is now described as an example of a suitable pyrolysis reactor for processing a solution or slurry of plastic particles. The fluidized bed can correspond to a fluidized bed of heat transfer particles. Sand is an example of a suitable type of particle for the fluidized bed, although any convenient type of particle can be used. During operation, heated heat transfer particles can be passed into the pyrolysis reactor to provide heat for the reaction. The feedstock can be introduced separately, to avoid melting of the plastic feedstock. A separate fluidizing gas can also be introduced at the bottom of the reactor to maintain the fluidized bed conditions.

The pyrolysis product can correspond to a gas phase product at the temperatures of the fluidized bed. As a result, the pyrolysis product can be withdrawn from the top of the reactor, while cooled heat transfer particles (such as cooled sand) can be withdrawn from a location near the bottom of the fluidized bed. After exiting from the pyrolysis reactor, the heat transfer particles can be separated from the vapor portions of the pyrolyzed effluent using a cyclone or another solid/vapor separator. Such a separator can also remove any other solids present after pyrolysis. Optionally, in addition to a cyclone or other primary solid/vapor separator, one or more filters can be included at a location downstream from the cyclone to allow for removal of fine particles that become entrained in the vapor phase. The cooled heat transfer particles can be passed into a regenerator to burn off coke and heat the particles, which are then returned to the reactor to provide the heat for pyrolysis. Depending on the amount of coke on the heat transfer particles, addition fuel can optionally be combusted in the regenerator to sufficiently increase the temperature of the heat transfer particles for maintenance of temperature in the fluidized bed of the pyrolysis reactor. The temperature of the heat transfer particles when leaving the regenerator can be greater than the desired temperature in the fluidized bed of the pyrolysis reactor by 50° C. or more, or 100° C. or more, such as up to 200° C. or possibly still greater.

One of the difficulties with pyrolysis of plastic waste (and/or other polymers) can be handling chlorine that is evolved during pyrolysis, such as chlorine derived from pyrolysis of polyvinyl chloride and/or polyvinylidene chloride. In some aspects, the production of chlorine in the pyrolysis reactor can be mitigated by including a calcium source in the heat transfer particles, such as including calcium oxide particles. Within the pyrolysis environment, calcium oxide can react with chlorine generated during pyrolysis to form calcium chloride. This calcium chloride can then be purged from the system as part of a purge stream for the heat transfer particles. A corresponding make-up stream of fresh heat transfer particles can be introduced to maintain a desired amount of the heat transfer particles in the polyolefin pyrolysis stage.

The pyrolysis effluent generated from pyrolysis of the plastic feedstock can include hydrocarbons with a range of boiling points. The pyrolysis effluent can generally include hydrocarbons ranging from $C_1$ compounds (methane) up to $C_{60}$ compounds or possibly compounds including still higher numbers of carbon atoms.

After pyrolysis, the resulting pyrolysis effluent can be optionally cooled as needed to allow for separation. One or more separation stages can then be used to separate desired naphtha and/or distillate boiling range product from light ends and the heavier portions of the effluent that can be used as a recycle stream. Light ends refers to components boiling below the naphtha boiling range. This can include various $C_{4-}$ hydrocarbons and carbon oxides. Such light ends can also include contaminant gases formed during pyrolysis, such as HCl, $H_2S$, and $NH_3$. In aspects where a reduced pyrolysis temperature is used (500° C. or less), the production of light ends can be reduced or minimized in favor of naphtha or distillate boiling range product.

Depending on the nature of the pyrolysis reactor, an optional particle separation stage can be used to remove particles from the pyrolysis effluent prior to separation. The particle separation stage can be used, for example, to remove sand and/or other heat transfer particles from the pyrolysis effluent. One or more fractionators, flash separators, gas-liquid separators, and/or other separation stages can then be used to separate the pyrolysis effluent to form at least the recycle stream and one or more lower boiling fractions. The one or more lower boiling fractions can include, for example, a light ends fraction, a naphtha boiling range fraction, a distillate boiling range fraction, and/or combinations of the above types of fractions. Optionally, a fraction could also be formed that include a portion of vacuum gas oil boiling range products, if desired, and if sufficient pyrolysis effluent is available to still form the desired recycle stream.

After separation, the lower boiling portions can be used directly as products and/or can be passed into one or more subsequent stages for additional processing. At least a portion of the higher boiling products can be used as the recycle stream. It is noted that at startup, sufficient recycled effluent may not be available. At startup, the recycle stream can be supplemented with a suitable heavy feedstock that includes 80 wt % or more of components boiling about 350° C.

Additional Processing of Pyrolysis Effluent

Polymers can include a variety of contaminants that are present in larger quantities than crude oil fractions typically used as feed for pyrolysis. This can include contaminants such as chlorine that are substantially not present in typical crude oil fractions. This can also include contaminants such as oxygen and nitrogen that may be present in elevated amounts in a polyolefin feed. Some contaminants can correspond to components of the underlying polyolefin, such as the chlorine in polyvinyl chloride or the nitrogen in polyamine. Other contaminants can be present due to additives that are included when making a formulated polymer and/or due to packaging, adhesives, and other compounds that become integrated with the polyolefins after formulation. Such additives, packaging, adhesives, and/or other compounds can include additional contaminants such as chlorine, mercury, and/or silicon.

After removing solids, and optionally after performing one or more separations on the pyrolysis effluent, additional processing can optionally be performed on one or more fractions of the pyrolysis effluent to remove contaminants. For example, a variety of contaminant gases can be evolved under pyrolysis conditions, depending on the nature of the plastic feedstock. Such contaminant gases can include, but are not limited to, $H_2S$, $NH_3$, HCl, and various other light gases that can be formed from polymers that include atoms other than carbon and hydrogen. In some aspects, an initial gas-liquid separation can be performed on the pyrolysis effluent to reduce the volume of pyrolysis effluent that needs to be passed through one or more contaminant removal stages in order to remove such contaminant gases. A guard bed (or group of guard beds) an example of a type of contaminant removal stage.

A water wash, optionally at acidic or basic conditions, is another example of a type of contaminant removal stage. Optionally, the water wash can correspond to an amine wash and/or a caustic wash. Using an amine wash and/or a caustic wash can assist with removal of chlorine as well as other contaminants, such as $CO_2$. Another option for performing an amine wash can be to include amines in the quench oil for the initial quench of pyrolysis and/or steam cracker effluent. This can allow a subsequent water wash to remove chlorine.

Additionally or alternately, an additional guard bed can be included for removal of Cl and/or HCl. In aspects where the polyolefin feed includes 2.0 wt % or less of polyvinyl chloride and/or polyvinylidene chloride, a guard bed for removal of chlorine compounds can be suitable for chlorine removal. Examples of suitable guard bed particles for chlorine removal include calcium oxide, magnesium oxide, zinc oxide, and combinations thereof.

Still another type of guard bed can correspond to a guard bed for removal of ammonia. In addition to nitrogen-containing polymers such as polyamines, various types of polymer additives can include nitrogen. In a pyrolysis environment, a portion of this nitrogen can be converted to ammonia. Various types of adsorbents are available for removal of ammonia, such as molecular sieve base adsorbents.

A fixed bed mercury trap can also be included as part of the contaminant removal stage(s). The elevated temperatures present in a pyrolysis reaction environment can convert any mercury present in the polyolefin feed into elemental mercury. Such elemental mercury can then be removed using a guard bed. It is noted that some guard beds suitable for mercury removal can also be suitable for silicon removal. Examples of such guard beds include guard beds including refractory oxides with transition metals optionally supported on the surface, such as the oxides and metals used in demetallization catalysts or a spent hydrotreating catalysts. Additionally or alternately, separate guard beds and/or traps can be used for silicon and mercury removal, or separate adsorbents for silicon removal and mercury removal can be included in a single guard bed. Examples of suitable mercury adsorbents and silicon adsorbents can include, but are not limited to, molecular sieves that are suitable for adsorption of mercury and/or silicon.

After separation of contaminant gases, the lower boiling (gas phase) portions of the pyrolysis effluent can optionally be passed to a second thermal cracking process, such as a steam cracking process. For example, after removal of contaminants, a $C_{5+}$ fraction of the gas phase pyrolysis effluent can be passed into the second thermal cracking process, or a $C_{2+}$ fraction, or possibly substantially all of the remaining gas phase pyrolysis effluent.

Secondary Thermal Cracking Conditions—Steam Cracking

Steam cracking is an example of a pyrolysis process that can be used as the secondary thermal cracking process for olefin production. In various aspects, the input flow to the secondary thermal cracking process can correspond to a mixture of a portion of the effluent from the first pyrolysis process and a conventional liquid steam cracker feed. In some aspects, the conventional liquid steam cracker feed can be mixed with the portion of the effluent from the first pyrolysis process prior to entering the steam cracking stage. In other aspect, mixing can occur within the steam cracking stage.

Conventionally, a liquid feed for steam cracking can correspond to any type of liquid feed (i.e., feed that is liquid at 20° C. and 100 kPa-a, as defined herein). Examples of suitable reactor feeds can include whole and partial crudes, naphtha boiling feeds, distillate boiling range feeds, resid boiling range feeds (atmospheric or vacuum), or combinations thereof. Additionally or alternately, a suitable feed can have a T10 distillation point of 100° C. or more, or 200° C. or more, or 300° C. or more, or 400° C. or more, and/or a suitable feed can have a T95 distillation point of 450° C. or less, or 400° C. or less, or 300° C. or less, or 200° C. or less. It is noted that the feed for steam cracking can be fractionated to remove a bottoms portion prior to performing steam cracking so that the feed entering the reactor has a T95 distillation point of 450° C. or less. However, in aspects where the initial pyrolysis stage uses recycle, this is typically not necessary, as any 450° C.+ components in the initial pyrolysis effluent can be incorporated into the recycle stream for the initial pyrolysis stage. The distillation boiling range of a feed can be determined, for example, according to ASTM D2887. If for some reason ASTM D2887 is not suitable, ASTM D7169 can be used instead. Although certain aspects of the invention are described with reference to particular feeds, e.g., feeds having a defined T95 distillation point, the invention is not limited thereto, and this description is not meant to exclude other feeds within the broader scope of the invention.

A steam cracking plant typically comprises a furnace facility for producing steam cracking effluent and a recovery facility for removing from the steam cracking effluent a plurality of products and by-products, e.g., light olefin and pyrolysis tar. The furnace facility generally includes a plurality of steam cracking furnaces. Steam cracking furnaces typically include two main sections: a convection section and a radiant section, the radiant section typically containing burners. Flue gas from the radiant section is conveyed out of the radiant section to the convection section. The flue gas flows through the convection section and can then be optionally treated to remove combustion by-products such as $NO_x$. Hydrocarbon is introduced into tubular coils (convection coils) located in the convection section. Steam is also introduced into the coils, where it combines with the hydrocarbon to produce a steam cracking feed. The combination of indirect heating by the flue gas and direct heating by the steam leads to vaporization of at least a portion of the steam cracking feed's hydrocarbon component. The steam cracking feed containing the vaporized hydrocarbon component is then transferred from the convection coils to tubular radiant tubes located in the radiant section. Indirect heating of the steam cracking feed in the radiant tubes results in cracking of at least a portion of the steam cracking feed's hydrocarbon component. Steam cracking conditions in the radiant section, can include, e.g., one or more of (i) a temperature in the range of 760° C. to 880° C., (ii) a pressure in the range of from 1.0 to 5.0 bars (absolute), or (iii) a cracking residence time in the range of from 0.10 to 0.5 seconds.

Steam cracking effluent is conducted out of the radiant section and is quenched, typically with water or quench oil. The quenched steam cracking effluent is conducted away from the furnace facility to the recovery facility, for separation and recovery of reacted and unreacted components of the steam cracking feed. The recovery facility typically includes at least one separation stage, e.g., for separating from the quenched effluent one or more of light olefin, steam cracker naphtha, steam cracker gas oil, steam cracker tar, water, light saturated hydrocarbon, and molecular hydrogen.

Steam cracking feed typically comprises hydrocarbon and steam, such as 10.0 wt % or more hydrocarbon, based on the weight of the steam cracking feed, or 25.0 wt % or more, or 50.0 wt % or more, or 65 wt % or more, and possibly up to 80.0 wt % or possibly still higher. Although the hydrocarbon can comprise one or more light hydrocarbons such as methane, ethane, propane, butane etc., it can be particularly advantageous to include a significant amount of higher molecular weight hydrocarbon. Using a feed including higher molecular weight hydrocarbon can decrease feed cost, but can also increase the amount of steam cracker tar in the steam cracking effluent. In some aspects, a suitable steam cracking feed can include 10 wt % or more, or 25.0 wt % or more, or 50.0 wt % or more (based on the weight of the steam cracking feed) of hydrocarbon compounds that are in the liquid and/or solid phase at ambient temperature and atmospheric pressure, such as up to having substantially the entire feed correspond to heavier hydrocarbons.

The hydrocarbon portion of a steam cracking feed can include 10.0 wt % or more, or 50.0 wt % or more, or 90.0 wt % or more (based on the weight of the hydrocarbon) of one or more of naphtha, gas oil, vacuum gas oil, waxy residues, atmospheric residues, residue admixtures, or crude oil, such as up to substantially the entire feed. Such components can include those containing 0.1 wt % or more asphaltenes. When the hydrocarbon includes crude oil and/ or one or more fractions thereof, the crude oil is optionally desalted prior to being included in the steam cracking feed. A crude oil fraction can be produced by separating atmospheric pipestill ("APS") bottoms from a crude oil followed by vacuum pipestill ("VPS") treatment of the APS bottoms. One or more vapor-liquid separators can be used upstream of the radiant section, e.g., for separating and conducting away a portion of any non-volatiles in the crude oil or crude oil components. In certain aspects, such a separation stage is integrated with the steam cracker by preheating the crude oil or fraction thereof in the convection section (and optionally by adding of dilution steam), separating a bottoms steam comprising non-volatiles, and then conducting a primarily vapor overhead stream as feed to the radiant section.

After performing secondary thermal cracking (such as steam cracking), olefins can be recovered from the secondary thermal cracking effluent by any convenient method. For example, various separations can be performed to separate $C_2$, $C_3$, and/or $C_4$ olefins from the secondary thermal cracking effluent.

Configuration Example

FIG. 1 shows an example of a system for performing pyrolysis on plastic particles by using a substantial recycle stream. In FIG. 1, a plastic feedstock 101 is passed into a physical processing stage 110 for converting the plastic feedstock into plastic particle feed 115 containing particles of a suitable size. If plastic feedstock 101 corresponds to particles of a suitable size, physical processing stage 110 can be optional. The plastic particle feed 115 is then passed into blending vessel 120 for mixing with optionally heated recycle stream 155. This forms a solution or slurry 125 of the plastic particles. The resulting solution or slurry 125 is then passed into pyrolysis reactor 130 to generate pyrolysis effluent 135. The pyrolysis effluent 135 can then be passed into one or more separation stages 140. The separation stages 140 can generate a light ends product 142, one or more naphtha and/or distillate boiling range products 145, and a bottoms product 147. The bottoms product 147 can optionally be heated 150 prior to use as the optionally heated recycle stream 155. Depending on the nature of the pyrolysis reactor, the separation stages 140 can also separate out heat transfer particles (not shown) for recycle back to the pyrolysis reactor 130.

Figure 3:
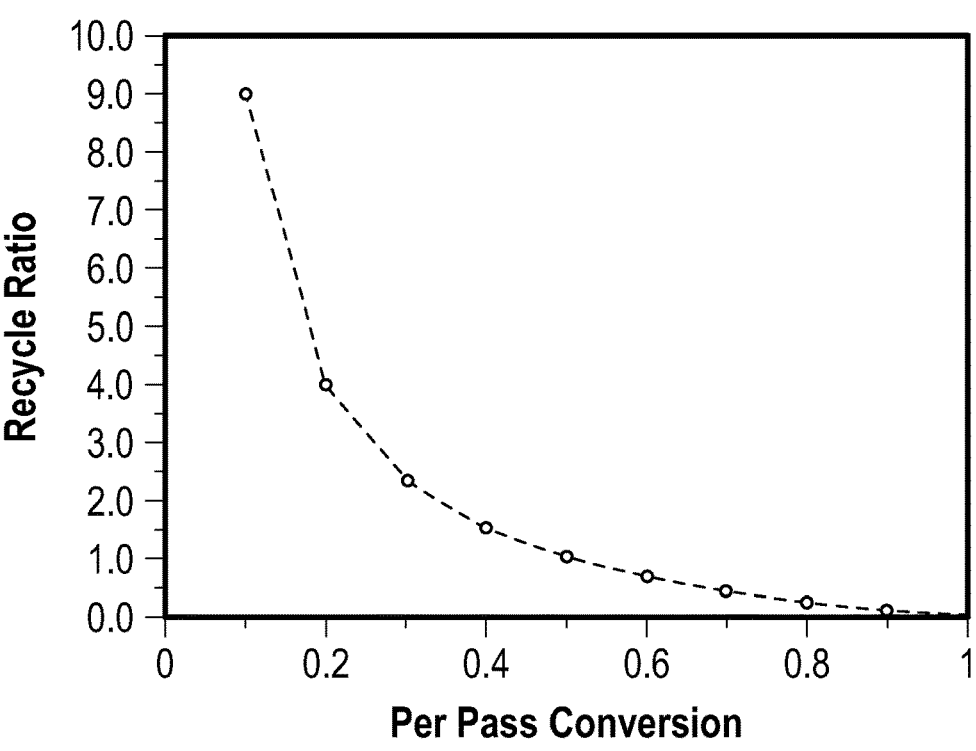
FIG. 3 shows a relationship between the recycle ratio and conversion in a pyrolysis reactor.

In some aspects, a pyrolysis reaction system (such as the system shown in FIG. 1) can be operated so that the portion of the effluent that is not converted relative to a cut point temperature is used as the recycle effluent. In such aspects, the operation of the reactor can be characterized based on using the cut point for separating the bottoms product 147 from the effluent as a "conversion temperature". In such aspects, the amount of recycle at steady state is related to the weight percentage of conversion in the pyrolysis reactor relative to the cut point/conversion temperature. Mathematically, if the amount of recycle is R, and the amount of fresh input flow is F, then a recycle ratio can be defined as R/F. If the amount of conversion during a single pass (relative to the cut point/conversion temperature) is "x", then the recycle ratio R/F is equal to (1−x)/x. FIG. 3 shows this relationship.

Figure 2:
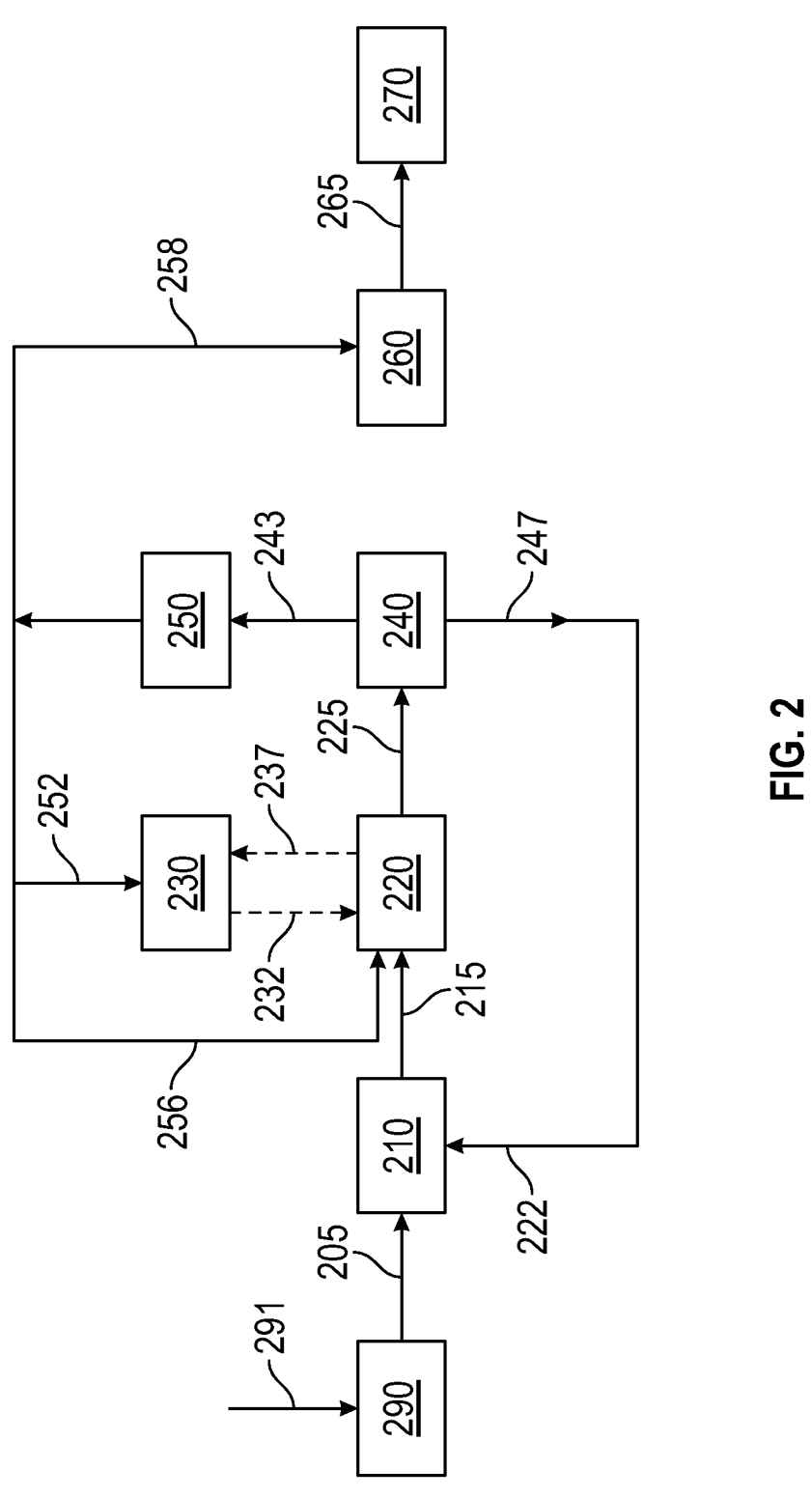
FIG. 2 shows an example of a process configuration for conversion of solid plastic feedstock into olefins via pyrolysis.

FIG. 2 shows an example of integrating an initial pyrolysis stage that includes recycle of the heavy portions of the pyrolysis effluent with a secondary thermal cracking process for olefin production. In FIG. 2, an initial feed of polymers and/or plastic 291 (optionally including other contaminants) is exposed to one or more pre-treatment processes 290 for preparing a plastic feedstock 205. The one or more pre-treatment processes 290 can include processes for forming plastic particles, physical processes for modifying plastic particle sizes, and/or any other convenient processes for preparing a plastic 205 feedstock that is suitable for entry into mixing stage 210. The mixing stage 210 can be used to mix the plastic feedstock 205 with recycle stream 222. Depending on the aspect, mixing the plastic feedstock 205 with recycle stream 222 can result in formation of either a solution or slurry of the plastic. The solution or slurry of the plastic can then be passed 215 into one or more pyrolysis reactors 220.

In addition to plastic feedstock 205, pyrolysis reactor(s) 220 also receive heated heat transfer particles 232 for heating a fluidized bed (or beds) within the pyrolysis reactors. Regenerator 230 receives cooled heat transfer particles 237 from pyrolysis reactor 220. Heat is generated in regenerator 230 by burning coke off of the cooled heat transfer particles 237. A stream of heated heat transfer particles 232 is then returned to pyrolysis reactor 220. Optionally, additional fuel can be burned in regenerator 230 to provide sufficient heat for maintaining the temperature in the one or more pyrolysis reactors 220. One potential source of that additional fuel can be a recycle stream 252 of light hydrocarbons that are separated out as part of the separations in contaminant removal stage 250. Additionally or alternately, a portion of the light hydrocarbons from contaminant removal can be returned 256 to the pyrolysis stage for use as a fluidizing gas.

The pyrolysis reactor(s) 220 can convert the solution or slurry of plastic 215 into a pyrolysis effluent 225. Initially, substantially all of the pyrolysis effluent is typically in the gas phase, due to the relatively high temperatures in the pyrolysis reactor(s). The pyrolysis effluent 225 can then be passed into a gas-liquid separation stage 240. The gas-liquid separation stage can include one or more initial quenches or other cooling steps so that the pyrolysis effluent 225 includes a gas phase fraction and a liquid phase fraction. The gas-liquid separation stage 240 can then separate at least one gas phase fraction 243 from at least one liquid phase fraction 247.

The gas phase fraction 243 can be passed into a contaminant removal stage 250. Contaminant removal stage 250 can include one or more processes and/or structures (such as guard beds) for removal of gas phase contaminants. This can include processes and/or structures for removal of chlorine, nitrogen, mercury, and/or other compounds different from hydrocarbons. Optionally, contaminant removal stage can further include at least one separator for separating a stream containing light (i.e., lower boiling) hydrocarbons from a higher boiling portion 258. At least a portion of the stream containing the light hydrocarbons can be used, for example, as recycle stream 252. The higher boiling portion 258 can correspond to any convenient higher boiling stream that could be formed by separation of the gas phase pyrolysis fraction. For example, the higher boiling portion 258 can be a $C_{2+}$ fraction, a $C_{5+}$ fraction, or another convenient higher boiling fraction. The higher boiling portion 258 can then be passed into a second thermal cracking stage 260, such as a steam cracking stage. This can produce on olefin-containing effluent 265. The olefin-containing effluent 265 can be passed into final separation stage 270 for separating out one or more olefin products. At least a portion of the liquid phase fraction 247 of the pyrolysis effluent can be used as recycle stream 222.

A configuration such as FIG. 2 provides examples of both direct fluid communication and indirect fluid communication between elements of the configuration. For example, the gas-liquid separation stage 240 shown in FIG. 2 is in direct fluid communication with pyrolysis reactor 220 and contaminant removal stage 250. It is noted that gas-liquid separation stage 240, as shown in FIG. 2, includes one or more cooling stages. If such cooling stage(s) were represented separately from the gas-liquid separation stage in FIG. 2, then the gas-liquid separation stage 240 would be in indirect fluid communication with pyrolysis reactor 220 via the separate cooling stage(s) (not shown).

Pyrolysis Examples

In order to test conversion of plastic when in solution, a pilot scale reactor was used to perform pyrolysis on a feed corresponding to 2.0 wt % low density polyethylene (LDPE) dissolved in an aromatic solvent. The aromatic solvent used was A200 aromatic solvent, available from ExxonMobil Corporation. The aromatic solvent was used so that the difference between the aromatic solvent and any conversion products and/or unconverted polymer could be readily identified using gas chromatography and/or gel permeation chromatography.

The pilot scale reactor was an isothermal downflow reactor. The LDPE was mixed with A200 in a separate feed vessel at a temperature of at least 120° C. to form a solution. The solution was then fed into the heated section of the reactor at a temperature of 500° C. Conversion of the LDPE at residence times in the reactor ranging from 5 seconds to 1000 seconds was investigated.

Figure 4:
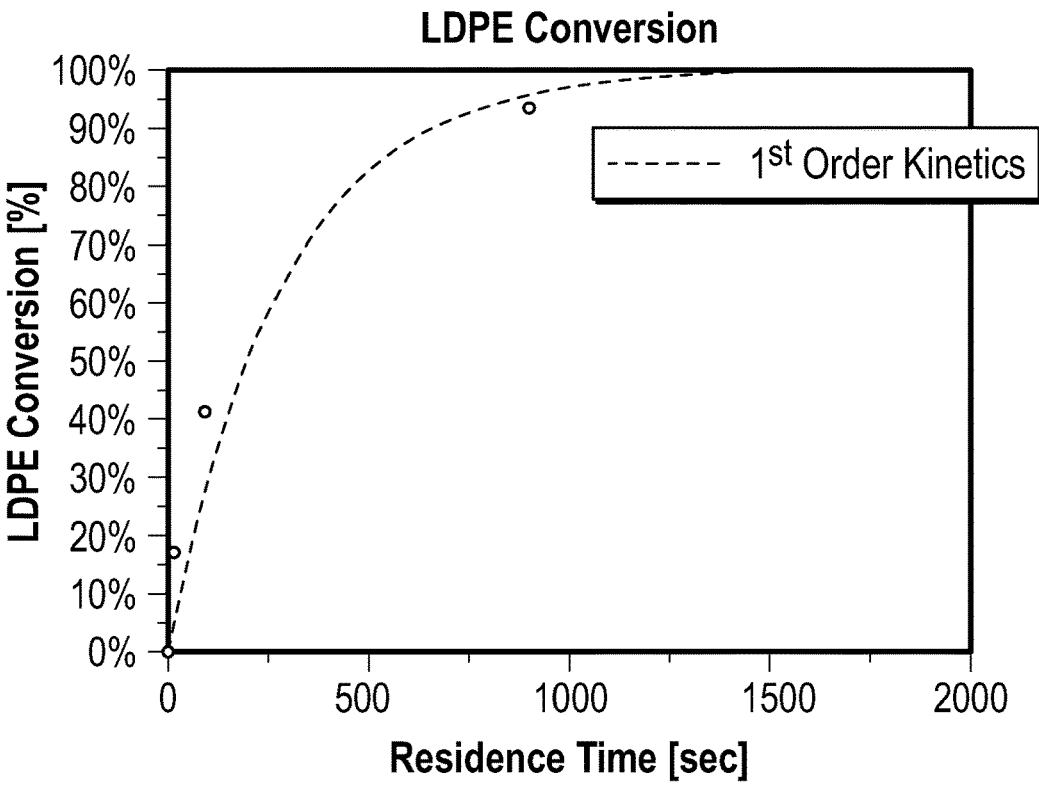
FIG. 4 shows results from conversion of low density polyethylene dissolved in an aromatic solvent under pyrolysis conditions.

FIG. 4 shows the relationship between residence time and conversion during the pyrolysis reaction. The dots correspond to measured data points, while the dotted line corresponds to a curve fit to the measured data points based on first order kinetics. The conversion amounts shown in FIG. 4 correspond to single pass conversion amounts, and represent just the conversion of the LDPE.

As shown in FIG. 4, at a pyrolysis reaction temperature of 500° C., for residence times on the order of 5 seconds to 10 seconds, the single pass conversion for the polyethylene was less than 20 wt %. In a steady state system where the polyethylene pyrolysis is being performed using recycle to deliver the polyethylene as a solution or slurry, this would correspond to a recycle ratio of roughly 4.0 at a conversion temperature of 550° C. or higher. This qualitatively indicates that at a pyrolysis temperature between 500° C. and 650° C., it should be possible to select pyrolysis conditions and a suitable recycle ratio for forming a slurry or solution so that substantially complete conversion of polyethylene can be achieved relative to a conversion temperature of 370° C. or less.

ADDITIONAL EMBODIMENTS

Embodiment 1. A method for performing pyrolysis on a plastic feedstock, comprising: mixing a feedstock comprising plastic particles having an average diameter of 3.0 cm or less with a recycled effluent fraction to form a slurry of plastic particles in recycled effluent, a weight ratio of the recycled effluent fraction to the plastic particles being 1.0 or more, the mixing being performed at a temperature of 150° C. or less; introducing the slurry of plastic particles in recycled effluent into a fluidized bed pyrolysis reactor, the slurry of plastic particles in recycled effluent being exposed to a temperature of 300° C. or more for a thermal residence time of 30 seconds or less prior to the introduction into the fluidized bed pyrolysis reactor; pyrolyzing the slurry of plastic particles in recycled effluent in the fluidized bed pyrolysis reactor at a temperature of 500° C. to 900° C. to form a pyrolysis effluent, the fluidized bed comprising heat transfer particles, the pyrolysis conditions comprising a single pass conversion of 15 wt % to 50 wt % relative to a conversion temperature of 370° C. or less; separating at least a portion of the heat transfer particles from the pyrolysis effluent; and separating the pyrolysis effluent to form a bottoms fraction comprising the recycled effluent fraction and at least one additional fraction, the bottoms fraction comprising a T10 distillation point of the conversion temperature or less.

Embodiment 2. The method of Embodiment 1, wherein the weight ratio of the recycled effluent fraction to the plastic particles is 1.0 to 5.0.

Embodiment 3. The method of Embodiment 1 or 2, wherein the slurry of plastic particles in recycled effluent is exposed to a temperature of 200° C. or more for a thermal residence time of 30 seconds or less prior to the introduction into the fluidized bed pyrolysis reactor, or wherein the slurry of plastic particles in recycled effluent is exposed to a temperature of 300° C. or more for a thermal residence time of 10 seconds or less prior to the introduction into the fluidized bed pyrolysis reactor, or a combination thereof.

Embodiment 4. A method for performing pyrolysis on a plastic feedstock, comprising: mixing a feedstock comprising plastic particles having an average diameter of 3.0 cm or less with a recycled effluent fraction to form a solution of plastic in recycled effluent, a weight ratio of the recycled effluent fraction to the plastic particles being 0.2 or more; pyrolyzing the solution in a pyrolysis reactor under pyrolysis conditions comprising a temperature of 500° C. to 900° C. to form a pyrolysis effluent, the pyrolysis conditions comprising a single pass conversion of 40 wt % or less relative to a conversion temperature of 370° C. or less; and separating the pyrolysis effluent to form a bottoms fraction comprising the recycled effluent fraction and at least one additional fraction, the bottoms fraction comprising a T10 distillation point of the conversion temperature or less.

Embodiment 5. The method of Embodiment 4, wherein the mixing comprises mixing the feedstock comprising plastic particles and the recycled effluent at a temperature of 120° C. or more for a mixing residence time of 1.0 seconds to 600 seconds; or wherein the mixing comprises forming a mixture at a temperature of 150° C. or less, the method further comprising heating the mixture to a temperature of 120° C. or more for a mixing residence time of 1.0 seconds to 600 seconds.

Embodiment 6. The method of Embodiment 4 or 5, wherein the pyrolysis reactor comprises at least one of a fluidized bed reactor, a continuously stirred tank reactor, a moving bed reactor, a thermal cracking reactor.

Embodiment 7. The method of any of Embodiments 4 to 6, wherein a kinematic viscosity at 100° C. of the solution is 1000 cSt or less.

Embodiment 8. The method of any of the above embodiments, wherein the mixing is performed at a temperature of 120° C. or less.

Embodiment 9. The method of any of the above embodiments, the method further comprising: performing a second thermal cracking on at least a portion of the at least one additional fraction in a second thermal cracking stage to form an olefin-containing effluent.

Embodiment 10. The method of any of the above embodiments, wherein the pyrolysis is performed in the absence of a radical initiator.

Embodiment 11. The method of any of the above embodiments, wherein the solution or slurry is pyrolyzed at a temperature of 600° C. to 900° C.

Embodiment 12. The method of any of the above embodiments, wherein the net conversion of fresh feed relative to the conversion temperature is 95 wt % or more.

Embodiment 13. The method of any of the above embodiments, further comprising i) forming the plastic feedstock by physically processing plastic particles to reduce a median particle size of the plastic particles to 3.0 cm or less, ii) forming the plastic particles by physically processing bulk plastic, or iii) a combination of i) and ii).

Embodiment 14. The method of any of the above embodiments, wherein separating the at least a portion of the heat transfer particles from the pyrolysis effluent comprises separating the at least a portion of the heat transfer particles from the bottoms fraction.

Embodiment 15. A pyrolysis effluent formed according to the method of any of the above embodiments.

Additional Embodiment A: The method of any of Embodiments 4 to 14, wherein the weight ratio of the recycled effluent fraction to the plastic particles is 1.0 or more.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A method for performing pyrolysis on a plastic feedstock, comprising:
   mixing a feedstock comprising plastic particles having an average diameter of 3.0 cm or less with a recycled effluent fraction to form a slurry of plastic particles in recycled effluent, a weight ratio of the recycled effluent fraction to the plastic particles being 1.0 or more, the mixing being performed at a temperature of 150° C. or less;
   introducing the slurry of plastic particles in recycled effluent into a fluidized bed pyrolysis reactor for non-catalytic pyrolysis, the slurry of plastic particles in recycled effluent being exposed to a temperature of 200° C. or more for a thermal residence time from 0.1 second to 30 seconds prior to the introduction into the fluidized bed pyrolysis reactor;
   pyrolyzing the slurry of plastic particles in recycled effluent in the fluidized bed pyrolysis reactor at a temperature of 500° C. to 900° C. to form a pyrolysis effluent, the fluidized bed comprising heat transfer particles, the pyrolysis conditions comprising a single pass conversion of 15 wt % to 50 wt % relative to a conversion temperature of 370° C. or less;
   separating at least a portion of the heat transfer particles from the pyrolysis effluent; and
   separating the pyrolysis effluent to form a bottoms fraction comprising the recycled effluent fraction and at least one additional fraction, the bottoms fraction comprising a T10 distillation point of the conversion temperature or less.

2. The method of claim 1, wherein the weight ratio of the recycled effluent fraction to the plastic particles is 1.0 to 5.0.

3. The method of claim 1, wherein the slurry of plastic particles in recycled effluent is exposed to a temperature of 300° C. or more for the thermal residence time prior to the introduction into the fluidized bed pyrolysis reactor.

4. The method of claim 1, wherein the thermal residence time is from 0.1 second to 10 seconds.

5. The method of claim 1, wherein the mixing is performed at a temperature of 120° C. or less.

6. The method of claim 1, the method further comprising:
   performing a second thermal cracking on at least a portion of the at least one additional fraction in a second thermal cracking stage to form an olefin-containing effluent.

7. The method of claim 1, wherein the pyrolysis is performed in the absence of a radical initiator.

8. The method of claim 1, wherein the slurry is pyrolyzed at a temperature of 600° C. to 900° C.

9. The method of claim 1, wherein the net conversion of fresh feed relative to the conversion temperature is 95 wt % or more.

10. The method of claim 1, further comprising forming the plastic feedstock by physically processing plastic particles to reduce the average particle size of the plastic particles to 3.0 cm or less.

11. The method of claim 1, further comprising forming the plastic particles by physically processing bulk plastic.

12. The method of claim 1, wherein separating the at least a portion of the heat transfer particles from the pyrolysis effluent comprises separating the at least a portion of the heat transfer particles from the bottoms fraction.

13. The method of claim 1, wherein a kinematic viscosity at 100° C. of the slurry is 1000 cSt or less.

14. A method for performing pyrolysis on a plastic feedstock, comprising:

mixing a feedstock comprising plastic particles having an average diameter of 3.0 cm or less with a recycled effluent fraction to form a slurry of plastic in recycled effluent, a weight ratio of the recycled effluent fraction to the plastic particles being 0.2 or more, wherein the mixing comprises heating the feedstock and the plastic particles to a temperature of 120° C. or more for a mixing residence time from 1 second to 600 seconds;

introducing the solution of plastic in recycled effluent into a pyrolysis reactor for non-catalytic pyrolysis;

pyrolyzing the slurry in the pyrolysis reactor under pyrolysis conditions comprising a temperature of 500° C. to 900° C. to form a pyrolysis effluent, the pyrolysis conditions comprising a single pass conversion of 40 wt % or less relative to a conversion temperature of 370° C. or less; and separating the pyrolysis effluent to form a bottoms fraction comprising the recycled effluent fraction and at least one additional fraction, the bottoms fraction comprising a T10 distillation point of the conversion temperature or less.

15. The method of claim 14, the method further comprising:

performing a second thermal cracking on at least a portion of the at least one additional fraction in a second thermal cracking stage to form an olefin-containing effluent.

16. The method of claim 14, wherein the pyrolysis is performed in the absence of a radical initiator.

17. The method of claim 1, wherein the pyrolysis reactor comprises at least one of a fluidized bed reactor, a moving bed reactor, a thermal cracking reactor.

\* \* \* \* \*